United States Patent
Yamada et al.

(10) Patent No.: US 11,528,674 B2
(45) Date of Patent: Dec. 13, 2022

(54) CONTROL DEVICE AND CONTROL METHOD

(71) Applicant: NTT DOCOMO, INC., Tokyo (JP)

(72) Inventors: Takefumi Yamada, Tokyo (JP); Youhei Oono, Tokyo (JP); Yuichiro Segawa, Tokyo (JP); Shinya Hanano, Tokyo (JP); Takashi Yoshimoto, Tokyo (JP); Yasuhiro Kitamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 45 days.

(21) Appl. No.: 17/269,154

(22) PCT Filed: May 21, 2019

(86) PCT No.: PCT/JP2019/020124
§ 371 (c)(1),
(2) Date: Feb. 17, 2021

(87) PCT Pub. No.: WO2020/039672
PCT Pub. Date: Feb. 27, 2020

(65) Prior Publication Data
US 2021/0314896 A1    Oct. 7, 2021

(30) Foreign Application Priority Data
Aug. 24, 2018    (JP) .............................. JP2018-157218

(51) Int. Cl.
*H04W 56/00* (2009.01)
*H04W 4/02* (2018.01)
*H04W 72/12* (2009.01)

(52) U.S. Cl.
CPC ....... *H04W 56/0045* (2013.01); *H04W 4/023* (2013.01); *H04W 72/1205* (2013.01); *H04W 72/1268* (2013.01)

(58) Field of Classification Search
CPC ............ H04W 4/023; H04W 56/0045; H04W 72/0446; H04W 72/082; H04W 72/1205;
(Continued)

(56) References Cited

U.S. PATENT DOCUMENTS 11,140,695 B1 * 10/2021 Eyuboglu ......... H04W 72/1257
11,206,549 B1 * 12/2021 Eyuboglu ............. H04W 36/06
(Continued)

FOREIGN PATENT DOCUMENTS

EP    3182783 A1 *    6/2017    ........... H04B 7/2615

OTHER PUBLICATIONS

3rd Generation Partnership Project (3GPP TS) 36.300 "Evolved UTRA and Evolved UTRAN Overall description", (Dec. 2015) Stage 2 (Release 11), V11.14.0, http://www.3gpp.org, France, 210 pages. Date: Dec. 2015.
(Continued)

*Primary Examiner* — Nathan S Taylor
(74) *Attorney, Agent, or Firm* — Dilworth IP, LLC

(57) ABSTRACT

If a propagation delay equal to or greater than a threshold value is detected in the uplink of a time-division duplex between a first wireless communication terminal and a first wireless base station, a suppression unit 52 performs control pertaining to resources in the time-division duplex of a first wireless communication terminal. Thereby, communication errors that occur in a second wireless communication terminal wirelessly connected to the second wireless base station that is different from the first wireless base station, to which the first wireless communication terminal is wirelessly connected, is suppressed by uplink communication performed by the first wireless communication terminal in accordance with the propagation delay. For example, this suppression process is a process pertaining to the assignment
(Continued)

of resources a time-division duplex with respect to the first wireless communication terminal.

14 Claims, 6 Drawing Sheets

(58) Field of Classification Search
CPC ... H04W 72/1268; H04W 4/02; H04W 56/00; H04W 72/12; H04W 72/04; G09G 3/00
See application file for complete search history.

(56) References Cited

U.S. PATENT DOCUMENTS

| | | | | |
|---|---|---|---|---|
| 11,271,699 B1* | 3/2022 | Eyuboglu | ............. | H04W 80/02 |
| 11,375,527 B1* | 6/2022 | Eyuboglu | .......... | H04B 7/15528 |
| 2011/0039499 A1* | 2/2011 | Zhang | ............... | H04W 74/0833 455/67.11 |
| 2012/0201223 A1* | 8/2012 | Chin | ................... | H04W 74/085 370/328 |
| 2013/0136028 A1* | 5/2013 | Gan | ................. | H04W 72/0486 370/252 |
| 2014/0198773 A1* | 7/2014 | Yin | ................... | H04W 56/0045 370/336 |
| 2016/0014746 A1* | 1/2016 | Ode | ................... | H04W 72/042 370/330 |
| 2016/0028533 A1* | 1/2016 | Kazmi | ............. | H04W 72/0413 370/296 |
| 2016/0105304 A1* | 4/2016 | Kwon | ................... | H04W 56/00 370/338 |
| 2017/0078991 A1* | 3/2017 | Chae | ................... | H04W 56/002 |
| 2018/0047284 A1* | 2/2018 | Narasimha | ............. | G08G 1/094 |
| 2018/0069684 A1* | 3/2018 | Ziren | ................ | H04W 56/0065 |
| 2018/0279325 A1* | 9/2018 | Huang | ................... | H04L 43/16 |
| 2018/0376438 A1* | 12/2018 | Islam | ................. | H04W 56/001 |
| 2019/0098589 A1* | 3/2019 | Chae | .................. | H04W 72/048 |
| 2019/0260566 A1* | 8/2019 | Fehrenbach | ...... | H04W 72/0446 |
| 2019/0342057 A1* | 11/2019 | Rico Alvarino | .. | H04W 28/0236 |
| 2020/0107275 A1* | 4/2020 | Cho | ................. | H04W 74/0833 |
| 2020/0120458 A1* | 4/2020 | Aldana | ................... | H04W 4/08 |
| 2020/0221503 A1* | 7/2020 | Kusashima | ....... | H04W 74/0833 |
| 2020/0328776 A1* | 10/2020 | Scholand | ............... | H04B 1/715 |
| 2021/0176720 A1* | 6/2021 | Chae | ................... | H04W 56/004 |
| 2021/0306127 A1* | 9/2021 | Sundberg | ................. | H04L 5/14 |

OTHER PUBLICATIONS

International Search Report issued in corresponding PCT Application No. PCT/JP2019/020124 issued Jun. 25, 2019.

* cited by examiner

| AIRSPACE ID | SPECIFIED AIRSPACE FLAG | TERMINAL ID |
|---|---|---|
| A001 | 0 | T001,T003 |
| A002 | 1 | – |
| A003 | 0 | T012,T022,T050 |
| ... | ... | ... |

CONTROL DEVICE AND CONTROL METHOD

TECHNICAL FIELD

The present invention relates to a technique for controlling wireless communication of a wireless communication terminal mounted to a flying body.

BACKGROUND ART

Long term evolution (LTE) has been developed into specifications for the purpose of further increasing a data rate and/or reducing delays in universal mobile telecommunications system (UMTS) networks 1: 3GPP TS 36.300 "Evolved UTRA and Evolved UTRAN Overall description". In LTE, as multi-access systems, a system using orthogonal frequency division multiple access (OFDMA) as a base is used in a downlink, and a system using single carrier frequency division multiple access (SC-FDMA) as a base is used in an uplink. Moreover, for the purpose of increasing bandwidth and speed from LTE, LTE successor systems (sometimes referred to as LTE advanced or enhanced LTE, for example (hereafter referred to as "LTE-A")) have been examined and specifications therefor developed (Rel. 10/11).

Duplex modes of wireless communications in LTE and LTE-advanced systems include frequency division duplex (FDD) in which an uplink (UL) and a downlink (DL) are subject to frequency division, and time division duplex in which an uplink and a downlink are subject to time division. In TDD, the same frequency region is applied to the communication of the uplink and downlink, the uplink and downlink are subject to time division, and wireless signal waves are transmitted/received.

The TDD of an LTE system, as exemplified in FIG. 1, has a frame configuration including an uplink subframe (UL SF) and a downlink subframe (FL SF). Moreover, when switching from DL to UL, a special subframe (SP SF) is set. A special subframe comprises a DL link extension period (DL extension), a guard period (GP), and an uplink extension period (UL extension).

Similar to wireless communication terminals mounted on unmanned flying bodies i.e. drones, there exist wireless communication terminals that can perform communication in skies with clear visibility in all directions. However, a wireless communication terminal that is present farther than estimated from a wireless base station may become wirelessly connected with the wireless base station. This causes a long delay for UL data transmitted from the wireless communication terminal to be propagated to the wirelessly connected wireless base station.

FIG. 2 shows the cause of a negative effect that occurs with another wireless communication terminal when a long delay occurs in the uplink of a time-division duplex between a wireless communication terminal and a wireless base station. FIG. 2 exemplifies a situation in which a wireless communication terminal DR1 mounted on a given flying body is wirelessly connected to a wireless base station BS1, a wireless communication terminal DR2 mounted on a different flying body is wirelessly connected to a wireless base station BS2, and a wireless communication terminal MT1 held by a user on the ground is wirelessly connected to wireless base station BS2. At this time, a distance L0 between wireless communication terminal DR1 and wireless base station BS1 is greater than a distance L2 between wireless communication terminal DR1 and wireless communication terminal MT1, which is greater than distance L1 between wireless communication terminal DR1 and wireless communication terminal DR2.

The transmission timing of UL data from a wireless communication terminal to a wireless base station is adjusted by use of a time alignment function. For example, wireless communication terminal DR1 begins transmission of UL data before the timing of a UL period assigned to wireless base station BS1, by the amount of propagation delay. Transmission overlap of the UL data in time with the DL period of another wireless communication terminal, causes problems to occur, such as interference; thus, a guard period (GP) is provided between a DL extension period and a UL extension period. An appropriate value is set for the length of this GP for each wireless base station. In FIG. 2, the length of the period of the GP of wireless base station BS1 is greater than the length of the period of the GP of wireless base station BS2. Here, it is assumed that the timings of the start and end of each subframe are synchronized between wireless base stations. That is, the timings of the start and end of the uplink subframe and downlink subframe in wireless base stations BS1 and BS2 are the same.

As described above, since a wireless communication terminal mounted on a flying body may be farther away than estimated from a wireless base station to which it is wirelessly connected, the propagation delay from wireless communication terminal DR1 to wireless base station BS1 in the example in FIG. 2 may be longer than the length of the period of the GP set in wireless base station BS1. As a result, UL data transmitted from wireless communication terminal DR1 can be received by wireless communication terminal DR2 or wireless communication terminal MT1, and further, if the reception strength at this time is equal to or greater than a threshold value, negative effects such as interference can occur. For instance, in the example in FIG. 2, no particular problems occur because the timing at which UL data transmitted from wireless communication terminal DR1 reaches wireless communication terminal MT1 belongs to the GP. Meanwhile, since the time taken for UL data transmitted from wireless communication terminal DR1 to reach wireless communication terminal DR2 belongs to the DL period, if the reception strength thereof is equal to or greater than a threshold value, problems such as interference occur with respect to wireless communication terminal DR2.

The present invention has been achieved in view of such situations, and its purpose is to suppress negative effects with respect to other wireless communication terminals if a long delay occurs in the uplink of a time-division duplex between a wireless communication terminal and a wireless base station.

SUMMARY OF INVENTION

The present invention provides a control device comprising: a detection unit configured to detect an occurrence of a propagation delay equal to or greater than a threshold value in an uplink of a time-division duplex between a first wireless communication terminal and a first wireless base station to which the first wireless communication terminal is wirelessly connected; and a suppression unit configured, in response to detection by the detection unit of a propagation delay equal to or greater than the threshold value, to perform control pertaining to resources in the time division duplex to suppress, in a second wireless communication terminal wirelessly connected to a second wireless base station different from the first wireless base station, occurrence of a communication failure caused by uplink communication performed by the first wireless communication terminal under the propagation delay.

The suppression unit may be configured to perform the suppression upon detecting that the second wireless communication terminal is present within a range of a given distance from the first wireless communication terminal or that the second wireless communication terminal is performing a time-division duplex with the second wireless base station with a guard period that is shorter than a guard period used between the first wireless communication terminal and the first wireless base station.

The given distance may be a distance at which the second wireless communication terminal is capable of receiving a wireless signal wave transmitted from the first wireless communication terminal at a reception strength that is equal to or greater than a threshold value.

The suppression unit may be configured to perform the suppression by assignment of resources in the time-division duplex of the first wireless communication terminal, or by control of a timing at which the uplink communication is performed in the time-division duplex of the first wireless communication terminal.

The suppression unit may be configured to perform the suppression by refraining from assigning resources within a special subframe in the time-division duplex to the first wireless communication terminal.

The suppression unit may be configured to perform the suppression by refraining from assigning resources immediately following a guard period in the time-division duplex to the first wireless communication terminal.

The suppression unit may be configured to perform the suppression by causing the first wireless communication terminal to perform the uplink communication in the time-division duplex at a timing that matches a start timing of a shortest guard period from among guard periods used by one or a plurality of the second wireless communication terminals.

The suppression unit may be configured to perform the suppression by assigning resources to the first wireless communication terminal, the resources corresponding to a start timing of a shortest guard period from among guard periods used by one or a plurality of the second wireless communication terminals, and to the propagation delay between the first wireless communication terminal and the first wireless base station.

The suppression unit may be configured to perform the suppression by synchronizing a length of time and a timing of guard periods used by the first wireless base station and the second wireless base station.

The present invention provides a control method comprising: detecting an occurrence of a propagation delay equal to or greater than a threshold value in an uplink of a time-division duplex between a first wireless communication terminal and a first wireless base station to which the first wireless communication terminal is wirelessly connected; and in response to the detection of the propagation delay equal to or greater than the threshold value, performing control pertaining to resources in the time division duplex to suppress, in a second wireless communication terminal wirelessly connected to a second wireless base station different from the first wireless base station, occurrence of a communication failure caused by uplink communication performed by the first wireless communication terminal under the propagation delay.

The present invention enables suppression of negative effects on other wireless communication terminals if a long delay occurs in the uplink of a time-division duplex between a wireless communication terminal and a wireless base station.

DETAILED DESCRIPTION

Configuration

Figure 3:
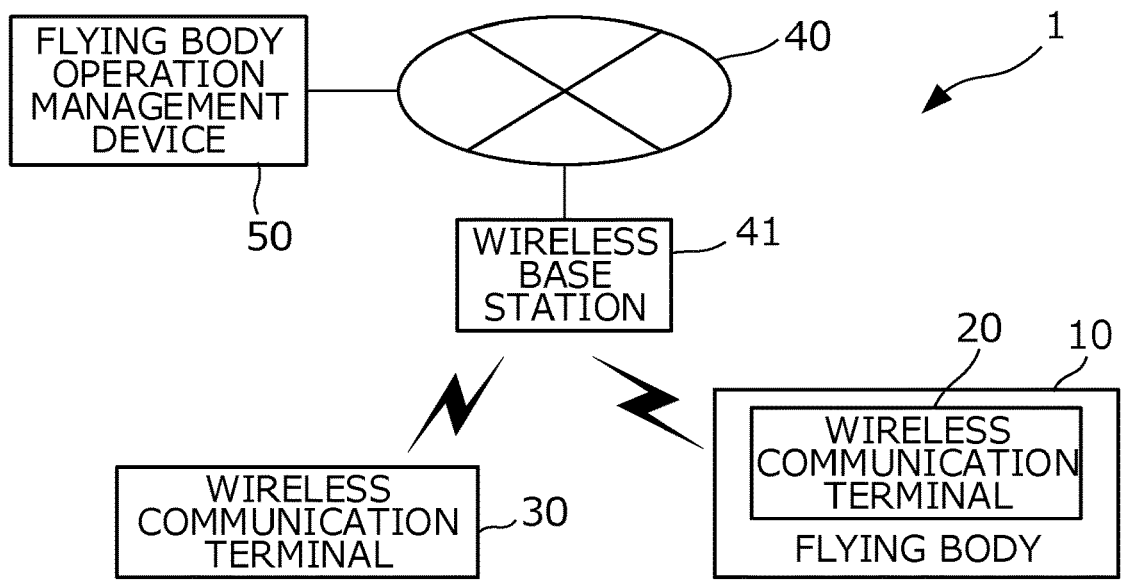
FIG. 3 illustrates a block diagram illustrating one example of the configuration of a flight control system, in accordance with the present invention.

FIG. 3 is a drawing illustrating one example of the configuration of a flight control system 1 pertaining to the present embodiment. Flight control system 1 comprises a flying body 10 such as a drone, a wireless communication terminal 20 mounted on flying body 10, a wireless communication terminal 30 to be used by a user on the ground, a network 40 including a wireless base station 41, and a flying body operation management device 50 that is connected to network 40.

In addition to a central processing unit (CPU), a read-only memory (ROM), a random access memory (RAM), and an auxiliary storage device, flying body 10 physically comprises: a computer comprising a positioning unit that measures the position of flying body 10, a communication interface that is connected to wireless communication terminal 20, and the like; and a drive mechanism including various sensors, motors, rotary blades, and the like, which are controlled by the computer. Flying body 10 flies under control of the drive mechanism in accordance with a determined flight plan.

In addition to a CPU, a ROM, a RAM, and an auxiliary storage device, wireless communication terminals 20 and 30 physically comprise communication interfaces for communicating via network 40, communication interfaces that are connected to the computer of flying body 10, and the like. A wireless communication system is made up of wireless communication terminals 20 and 30, and network 40, which includes wireless base station 41; and comprises for example, a wireless communication system that accords with long term evolution (LTE). In LTE, wireless communication terminals 20 and 30 are referred to as UEs, and wireless base station 41 is referred to as an eNB. An area capable of wirelessly communicating with each wireless base station 41 is referred to as a cell. Wireless communication terminals 20 and 30, which are within each cell, are wirelessly connected to wireless base station 41 that form the cell and perform wireless communication. For example, wireless communication terminal 30 used by a user on the ground performs, on the ground, wireless communication with wireless base station 41. Meanwhile, wireless communication terminal 20 mounted on flying body 10 performs wireless communication with wireless base station 41 not only on the ground but also in the air (for example, in an airspace at an altitude of 30 m or higher).

Flying body operation management device 50 manages the flight of flying body 10 in addition to functioning as a control device that controls the wireless communication of wireless communication terminal 20 mounted on flying body 10.

Figure 4:
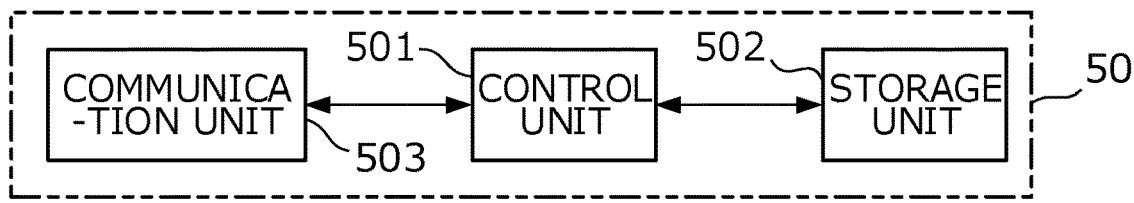
FIG. 4 illustrates a block diagram illustrating the hardware configuration of a flying body operation management device, in accordance with the present invention.

FIG. 4 is a drawing illustrating the hardware configuration of flying body operation management device 50. Flying body operation management device 50 is a computer device having a control unit 501 comprising a CPU, a ROM, and a RAM, a storage unit 502, and a communication unit 503. A CPU is a processor that performs various calculations. A ROM is a non-volatile memory that stores programs and data used to start up flying body operation management device 50, for example. A RAM is a volatile memory that functions as a work area when the CPU executes programs. Storage unit 502 is a non-volatile auxiliary storage device such as an HDD or an SSD, and stores programs and data used in flying body operation management device 50. The function illustrated in FIG. 5 below is realized by the CPU executing the program. Communication unit 503 is an interface for performing communication via network 40 in accordance with predetermined communication standards.

Figure 5:
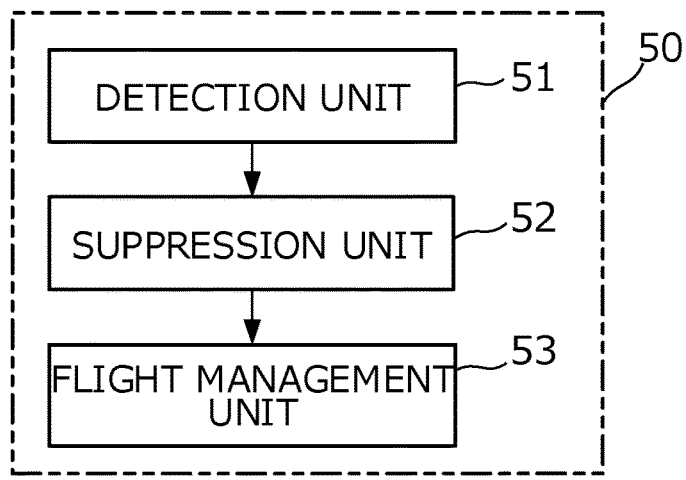
FIG. 5 illustrates a block diagram illustrating the functional configuration of a flying body operation management device, in accordance with the present invention.

FIG. 5 is a drawing illustrating one example of the functional configuration of flying body operation management device 50. Each of the functions of flying body operation management device 50 is realized by the CPU executing a predetermined software (program) and performing various calculations, and controlling communication by communication unit 503 and reading and/or writing of data in the ROM, RAM, and storage unit 502.

Figure 1:
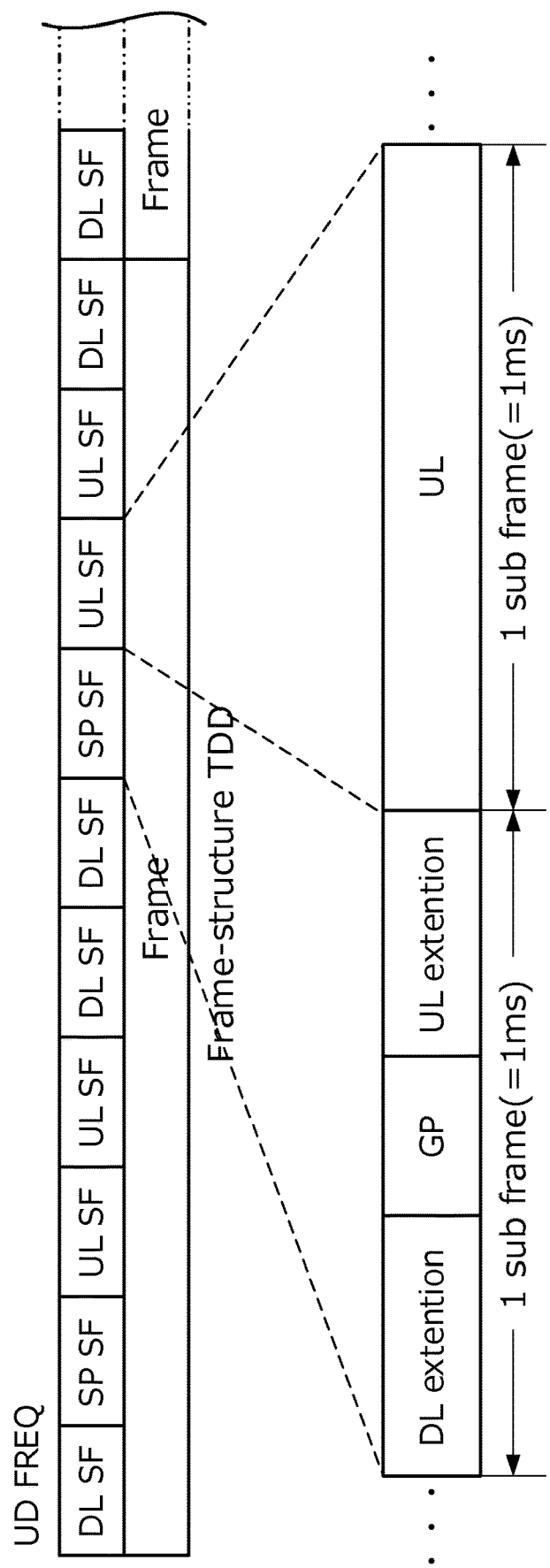
FIG. 1 illustrates a drawing exemplifying the frame configuration in the TDD of an LTE system.
Figure 2:
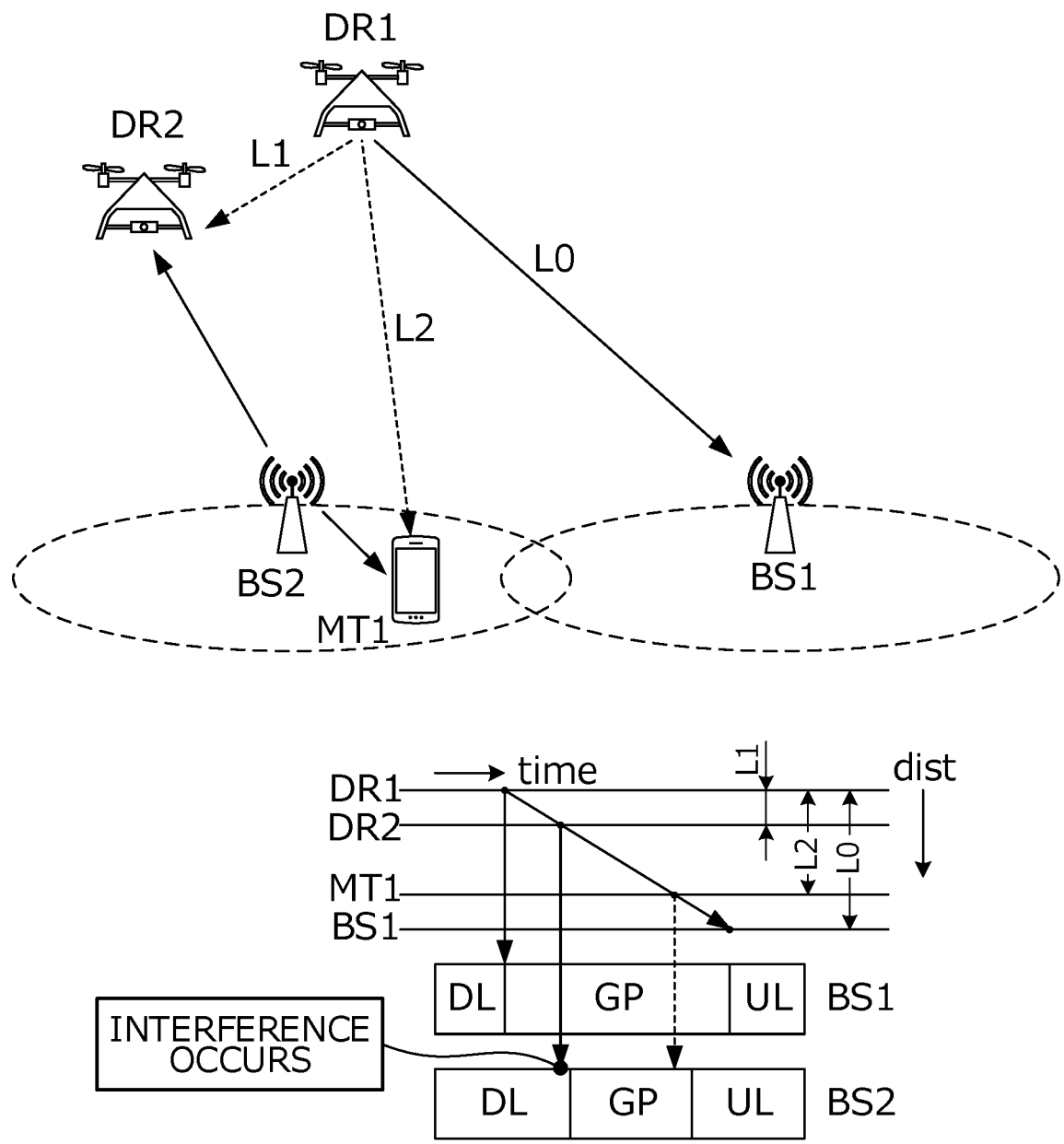
FIG. 2 illustrates a drawing explaining the cause of a negative effect that occurs in another wireless communication terminal when a long delay occurs in the uplink of a time-division duplex between a wireless communication terminal and a wireless base station.

In FIG. 5, detection unit 51 detects occurrences of propagation delays equal to or greater than a threshold value in the uplink of a time-division duplex between a first wireless communication terminal and a first wireless base station to which the first wireless communication terminal is wirelessly connected. More specifically, since it is possible to specify an amount of propagation delay between each wireless base station 41 and wireless communication terminal 20 wirelessly connected thereto, detection unit 51 collects information pertaining to an amount of propagation delay from each wireless base station 41, and specifies an airspace within a range from wireless base station 41, for which a propagation delay equal to or greater than a threshold value has occurred, to a distance corresponding to the amount of propagation delay thereof (propagation speed of wireless signal wave x amount of propagation delay). Specifying such an airspace corresponds to a process of detecting occurrence of a propagation delay equal to or greater than a threshold value in the uplink of a time-division duplex between the first wireless communication terminal and the first wireless base station. Moreover, another method exists, wherein the airspace in which occurrence of a propagation delay equal to or greater than a threshold value is specified by performing a simulation on the basis of the position and size of a cell in each wireless base station 41, map information, and a specific radio wave propagation model. The threshold value used here is the length of the GP at wireless base station 41 to which wireless communication terminal 20 is wirelessly connected, for example. In such an airspace, as exemplified in FIG. 2, the propagation delay of UL data transmitted from wireless communication terminal 20 mounted on flying body 10 becoming excessively long causes transmission of UL data to begin from a point in time that is a considerable time in the future thereafter, resulting in a possibility of the UL data thereof being received by other wireless communication terminals 20 and 30.

In a case that a propagation delay equal to or greater than a threshold value is detected in the uplink of the time-division duplex between the first wireless communication terminal and the first wireless base station, suppression unit 52 performs control pertaining to resources in the time-division duplex. Thereby, communication errors that occur in the second wireless communication terminal wirelessly connected to the second wireless base station that is different from the first wireless base station, to which the first wireless communication terminal is wirelessly connected, are suppressed by uplink communication performed by the first wireless communication terminal in accordance with the propagation delay. In the example in FIG. 2, in accordance with the propagation delay between wireless communication terminal DR1 (first wireless communication terminal) and wireless base station BS1 (first wireless base station), wireless communication terminal DR1 (first wireless communication terminal) transmits UL data ahead of time, by the amount of propagation delay thereof. Thereby, a communication error may occur in wireless communication terminal DR2 and MT1 (second wireless communication terminals) wirelessly connected to wireless base station BS2 (second wireless base station) that is different from wireless base station BS1 (first wireless base station), to which wireless communication terminal DR1 (first wireless communication terminal) is wirelessly connected. Accordingly, suppression unit 52 suppresses this communication error by performing control pertaining to resources in the time-division duplex. Hereafter, this control is referred to as the suppression process.

Figure 6:
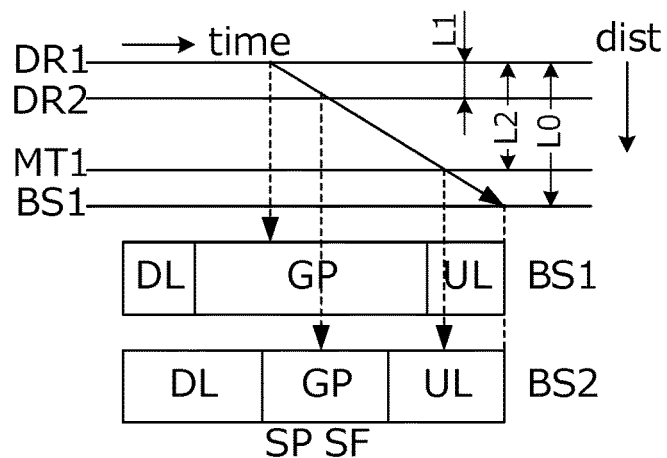
FIG. 6 illustrates a drawing illustrating one example of a suppression process, in accordance with the present invention.

This suppression process is, for example, a process pertaining to the assigning of resources in the time-division duplex of the first wireless communication terminal, or a process pertaining to the control of timings at which uplink communications are performed in the time-division duplex of the first wireless communication terminal. In the example in FIG. 2, the communication period of the uplink of the time-division duplex of wireless communication terminal DR1, which becomes the cause of communication errors that may occur in wireless communication terminals DR2 and MT1 (second wireless communication terminals) is moved back in terms of time to suppress UL data from reaching other wireless communication terminals in the DL section of other wireless communication terminals. One example of this suppression process is a process in which resources in a specific subframe in a time-division duplex is not assigned with respect to the first wireless communication terminal. In the example in FIG. 6, the resources within the special subframe (SP SF) in the time-division duplex are not assigned with respect to wireless communication terminal DR1 (UL subframes, which are after the special subframe, are assigned). Thereby, the UL data transmitted from wireless communication terminal DR1 reaches wireless communication terminal DR2 in the GP of the time-division duplex of wireless communication terminal DR2 that is wirelessly connected to wireless base station BS2, and the UL data reaches wireless communication terminal MT1 in the UL period of the time-division duplex of wireless communication terminal MT1 that is wirelessly connected to wireless base station BS2; therefore, the problem of interference of UL data does not occur with respect to wireless communication terminal DR2 or wireless communication terminal MT1.

Figure 7:
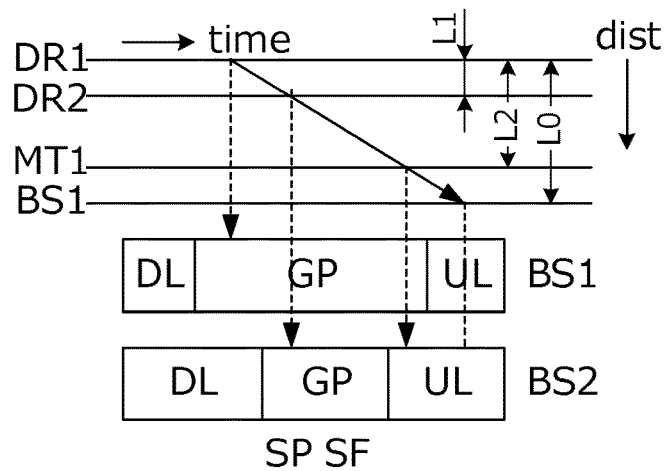
FIG. 7 illustrates a drawing illustrating one example of a suppression process, in accordance with the present invention.

Another example of the suppression process is a process in which resources are not assigned immediately after a guard period in the time-division duplex with respect to the first wireless communication terminal. In the example in FIG. 7, with respect to wireless communication terminal DR1, the resources immediately after the GP in the special subframe (SP SF) are not assigned, and the resources that belong to the UL period are assigned after a given period has elapsed from the end of the GP. Thereby, the UL data transmitted from wireless communication terminal DR1 reaches wireless communication terminal DR2 in the GP of the time-division duplex of wireless communication terminal DR2 that is wirelessly connected to wireless base station BS2, and since the UL data reaches wireless communication terminal MT1 in the UL period of the time-division duplex of wireless communication terminal MT1 that is wirelessly connected to wireless base station BS2, the problem of interference of UL data does not occur with respect to wireless communication terminal DR2 or wireless communication terminal MT1.

Figure 8:
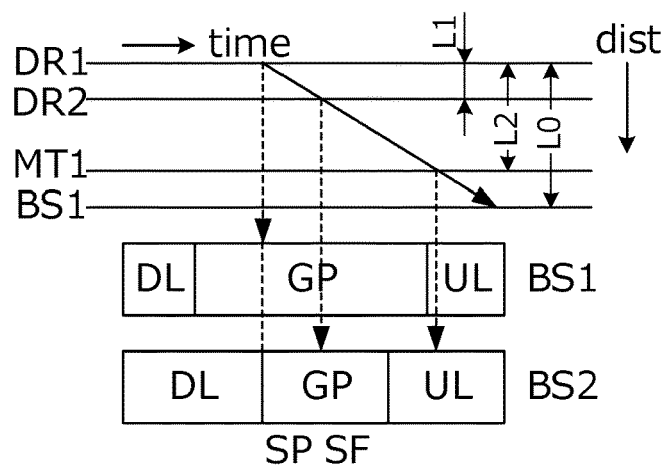
FIG. 8 illustrates a drawing illustrating one example of a suppression process, in accordance with the present invention.

Another example of the suppression process is a process in which the first wireless communication terminal is made to perform communication of the uplink of the time division duplex at a timing that matches the start timing of the shortest guard period from among the guard periods used by one or a plurality of the second communication terminals. In the example in FIG. 8, a command is issued so that UL data is transmitted from wireless communication terminal DR1 at the same timing as the timing at which the shortest GP (GP in wireless base station BS2) is started, with respect to wireless communication terminal DR1 (that is, resources in the UL period are assigned so that such transmission is carried out). Thereby, the UL data transmitted from wireless communication terminal DR1 reaches wireless communication terminal DR2 in the GP of the time-division duplex of wireless communication terminal DR2 that is wirelessly connected to wireless base station BS2, and since the UL data reaches wireless communication terminal MT1 in the UL period of the time-division duplex of wireless communication terminal MT1 that is wirelessly connected to wireless base station BS2, the problem of interference of UL data does not occur with respect to wireless communication terminal DR2 or wireless communication terminal MT1.

Another example of the suppression process is a process of assigning, with respect to the first wireless communication terminal, resources corresponding to the start timing of the shortest guard period from among the guard periods (GP) used by one or a plurality of second wireless communication terminals and the propagation delay that occurs between the first wireless communication terminal and the first wireless base station. That is, the point in time at which UL data transmitted from wireless communication terminal DR1 reaches wireless base station BS1 is set to be after the GP within the special subframe, taking into account the preparation delay that has occurred between the first wireless communication terminal and the first wireless base station from the start timing of the shortest guard period from among the guard periods used by one or a plurality of second wireless communication terminals.

Figure 9:
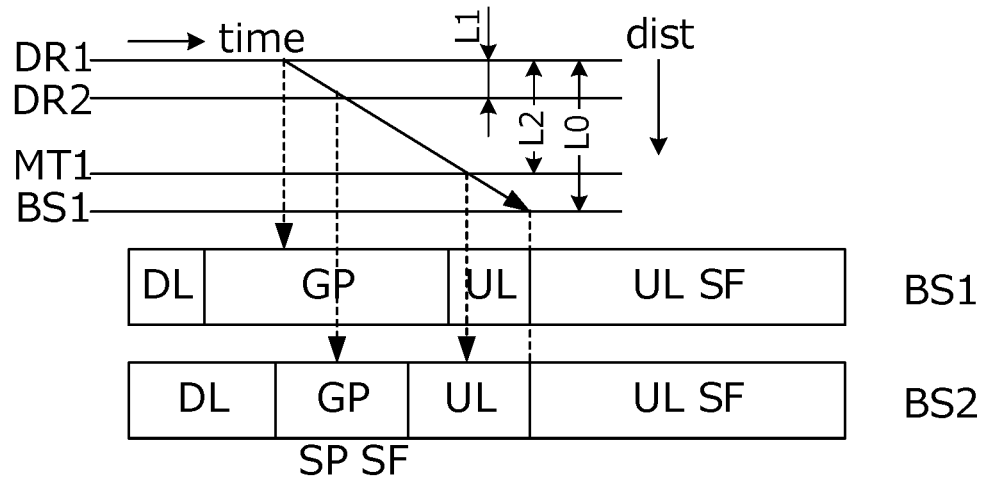
FIG. 9 illustrates a drawing illustrating one example of a suppression process, in accordance with the present invention.

Another example of the suppression process is a process of having the first wireless communication terminal perform uplink communication of the time-division duplex at a timing after the start timing of the uplink subframe within the special subframe in the time-division duplex. In the example in FIG. 9, a command is issued so that communication of the uplink of the time-division duplex is performed, with respect to wireless communication terminal DR1, at a timing after the start timing of the UL link subframe within the special subframe in the time-division duplex (that is, resources in the UL period are assigned so that such transmission is carried out). Thereby, the UL data transmitted from wireless communication terminal DR1 reaches wireless communication terminal DR2 in the UL period of the time-division duplex of wireless communication DR2 wirelessly connected to wireless base station BS2, and reaches wireless communication terminal MT1 in the UL period of the time-division duplex of wireless communication terminal MT1 wirelessly connected to wireless base station BS2; therefore, a problem of interference of UL data does not occur with respect to the wireless communication terminal DR2 or wireless communication terminal MT1.

Figure 10:
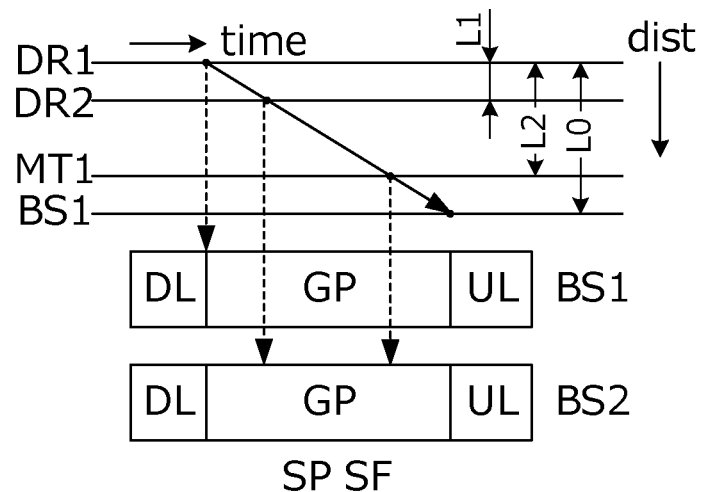
FIG. 10 illustrates a drawing illustrating one example of a suppression process, in accordance with the present invention.

Another example of the suppression process is a process, pertaining to time-division duplex resources, of synchronizing the length of time and timings of the guard periods used by the first wireless base station and second wireless base station. In the example in FIG. 10, the length of period and timing of the GP of the time-division duplex of wireless communication terminal DR1 wirelessly connected to wireless base station BS1, and the length of period and timing of the GP of the time-division duplex of wireless communication terminals DR2 and MT1 wirelessly connected to wireless base station BS2 are the same. Thereby, the UL data transmitted from wireless communication terminal DR1 reaches wireless communication terminal DR2 in the GP of the time-division duplex of wireless communication terminal DR2 that is wirelessly connected to wireless base station BS2, and the UL data reaches wireless communication terminal MT1 in the GP of the time-division duplex of wireless communication terminal MT1 that is wirelessly connected to wireless base station BS2; therefore, the problem of interference of UL data does not occur with respect to wireless communication terminal DR2 or wireless communication terminal MT1.

Suppression unit 52 issues a command, via network 40, for a process pertaining to resources of a time-division duplex such as those described above, with respect to the first wireless base station to which the first wireless communication terminal is wirelessly connected or the second wireless base station to which the second wireless communication terminal is wirelessly connected. In response to this command, the resources in each time-division duplex are controlled as in the examples in FIG. 6-10, by control of the first wireless base station or second wireless base station.

Moreover, suppression unit 52 may perform a suppression process such as that described above only if a propagation delay equal to or greater than a threshold value has occurred and if a substantial problem such as interference could occur. Specifically, if the following first condition and second condition are satisfied, suppression unit 52 suppresses communication errors that occur in the second wireless communication terminal. The first condition is that a second communication terminal wirelessly connected to the second wireless base station is present in the range of a given distance from the first wireless communication terminal, the second wireless base station being different from the first wireless base station to which the first wireless communication terminal is wirelessly connected. In the example in FIG. 2, wireless communication terminal DR2 (second communication terminal) wirelessly connected to wireless base station BS2 (second wireless base station) is present in a range of a given distance from wireless communication terminal DR1 (first wireless communication terminal), wireless base station BS2 (second wireless base station) being different from wireless base station BS1 (first wireless base station) to which wireless communication terminal DR1 (first wireless communication terminal) is wirelessly connected. Here, a "given distance" is substantially a distance at which it is possible to receive, at a reception strength equal to or greater than a threshold value, wireless signal waves transmitted from wireless communication terminal DR1 (first wireless communication terminal). Since it is possible to specify the positions of each of wireless communication terminals 20 and 30 using a global positioning system (GPS) or so-called wireless base station positioning, it is possible to determine the satisfaction of the first condition due to whether or not wireless communication terminals 20 and 30 are present within the range of a distance equal to or shorter than a given threshold value from an airspace in which a propagation delay equal to or greater than a threshold value occurs. As such, if the second wireless communication terminal sufficiently close to the first wireless communication terminal mounted on flying body 10 is present, it is possible that UL data transmitted from the first wireless communication terminal inevitably is received by the second wireless communication terminal at a sufficient reception strength.

The second condition is that the second wireless communication terminal performs a time-division duplex with the second wireless base station at a GP that is shorter than the length of the period of the GP between the first wireless communication terminal and the first wireless base station. In the example in FIG. 2, wireless communication terminal DR2 (second wireless communication terminal) performs a time-division duplex with wireless base station BS2 (second wireless base station) at a GP that is shorter than the length of the period of the GP between first wireless communication terminal DR1 (first wireless communication terminal) and first wireless base station BS1 (first wireless base station). In each wireless base station 41, since it is possible to specify the length of the period of the GP between wireless communication terminal 30 wirelessly connected thereto, suppression unit 52 is capable of collecting information pertaining to the length of the period of the GP from each wireless base station 41 and determining the satisfaction of the second condition. When such relationships with the length of period of GPs exist, it is possible that UL data transmitted from the first wireless communication terminal mounted on flying body 10 inevitably becomes received in the DL period of the second wireless communication terminal. In the present embodiment, suppression unit 52 performs a suppression process if the first condition and second condition are satisfied, but may perform a suppression process if the first condition or second condition is satisfied.

In addition to storing flight plans, flight management unit 53 records identification information and flight status thereof for flying body 10, which is under the control of flying body operation management device 50. Flight status includes the position in which flying body 10 is flying, and the date and time of the position. Wireless communication terminal 20 of flying body 10 notifies flying body operation management device 50 of the position, date and time via network 40. Flight management unit 53 determines whether or not the position, date and time are within the flight plan, and based on the results of the determination, issues flight commands to flying body 10 via network 40 and wireless communication terminal 20 as necessary.

Figures 11, 12:
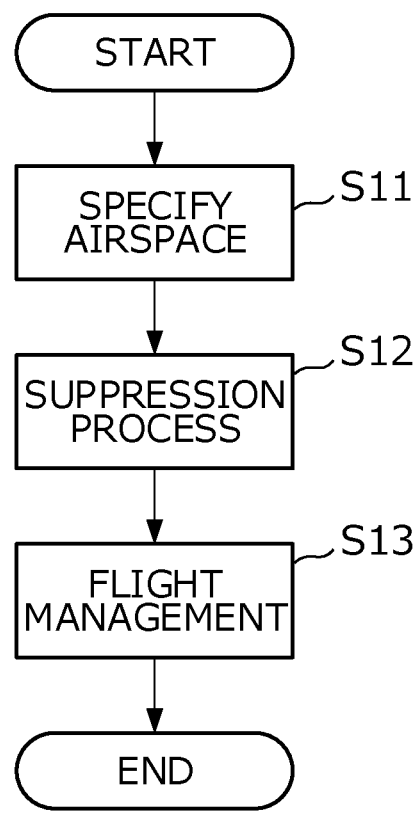
FIG. 11 illustrates a drawing illustrating one example of data stored in the flying body operation management device, in accordance with the present invention.
FIG. 12 illustrates a flow chart illustrating the processing steps of the flying body operation management device, in accordance with the present invention.

Next, the operation of the present embodiment is explained. In FIG. 12, detection unit 51 of flying body operation management device 50 specifies the airspace in which a propagation delay equal to or greater than a threshold value occurs, in the uplink of a time-division duplex between wireless communication terminal 20 and wireless base station 41 to which wireless communication terminal 20 is wirelessly connected (step S11). As exemplified in FIG. 11, for example, detection unit 51 writes a flag (specified airspace flag) by associating the flag with a specified airspace (hereafter referred to as specified airspace) from among airspace IDs which are identification information for each airspace in which flying body 10 may be flying. In the example in FIG. 11, specified airspace flag "1" signifies a specified airspace, and specified airspace flag "0" signifies an airspace that is not a specified airspace. The contents in FIG. 11 are stored in flight management unit 53 as a part of the flight plan.

Next, if a substantial problem such as interference occurs in an air space in which a propagation delay equal to or greater than a threshold value occurs, suppression unit 52 of flying body operation management device 50 performs the aforementioned suppression process (step S12). Specifically, if the aforementioned first condition and second condition are satisfied, suppression unit 52 performs a suppression process in the abovementioned specified airspace.

Flight management unit 53 performs flight management on flying body 10 (step S13). Specifically, flight management unit 53 creates a flight plan including flight routes, flight period and the like and stores the flight plan. Furthermore, flight management unit 53 records identification information and flight status thereof for flying body 10, which is under the control of flying body operation management device 50. Flight status includes the position in which flying body 10 is flying, and the date and time of the position. Wireless communication terminal 20 of flying body 10 notifies flying body operation management device 50 of the position, date and time via network 40. Flight management unit 53 determines whether or not the position, date and time are within the flight plan, and based on the results of the determination, issues flight commands to flying body 10 via network 40 and wireless communication terminal 20 as necessary.

According to the present embodiment explained above, negative effects on other wireless communication terminals are suppressed if a long delay has occurred in the uplink of a time-division duplex between a wireless communication terminal and a wireless base station.

MODIFIED EXAMPLES

The present invention is not limited to the above-described embodiment. The above-described embodiment may be modified as follows. Moreover, two or more of the following modified examples may be combined.

In the embodiment, detection unit specified an airspace in which a propagation delay equal to or greater than a threshold value occurs in the uplink of a time-division duplex between the first wireless communication terminal and the first wireless base station to which the first wireless communication terminal is wirelessly connected, but such specification of airspace is not essential; detection unit 51 need only detect the occurrence of a propagation delay equal to or greater than a threshold in the uplink of a time-division duplex between the first wireless communication terminal and the first wireless base station. For example, since it is possible to specify the amount of propagation delay between each wireless base station 41 and wireless communication terminal 20 that is wirelessly connected thereto, detection unit 51 may collect information pertaining to the amount of propagation delay from each wireless base station 41, and specify a pair of wireless base station 41, for which a propagation delay equal to or greater than a threshold value has occurred, and wireless communication terminal 30. Suppression unit 52 issues a command for a process pertaining to a resource such as that described above, with respect to wireless base station 41 included in the pair, via network 40. In response to this command, the resources in each time-division duplex are controlled as in the examples in FIG. 6-10 by wireless base station 41.

Suppression unit 52 of flying body operation management device 50 may store propagation delay information about whether or not a propagation delay equal to or greater than a threshold value has occurred in each airspace, condition satisfaction information about whether or not the aforementioned first condition and second condition have been satisfied in the airspace, and process information about whether or not the aforementioned suppression process has been executed in the airspace, by associating the information with one another, and determine the presence/absence of a suppression process according to the contents of the propagation delay information, condition satisfaction information and process information in each airspace and the frequency thereof. For example, if only propagation delay information indicating that a propagation delay equal to or greater than a threshold value has occurred in a given airspace A is stored at a low frequency, the probability of a substantial problem of interference having occurred is not high; therefore, satisfaction of the first condition and second condition may also be taken into account and the suppression process may be performed only if the conditions have been satisfied. Moreover, if, for example, propagation delay information indicating that a propagation delay equal to or greater than a threshold value has occurred in given airspace A and condition satisfaction information indicating that the first condition and second condition have been satisfied are stored at a high frequency, it is highly probable that a substantial problem of interference has occurred even if satisfaction of the first condition and second condition are not determined each time; therefore, the suppression process may be performed regardless of whether or not the first condition and second condition are satisfied.

The block diagram used to explain the above-described embodiment illustrates functional unit blocks. These functional blocks (components) are realized by arbitrarily combining hardware and/or software. The means for realizing each functional block is not particularly limited. That is, each functional block may be realized by one device that is physically and/or logically bound, or may be realized by a two or more devices, which are physically and/or logically separated, being directly and/or indirectly (for example, via a wire and/or wirelessly) connected.

Each mode/embodiment explained in the present specification may be applied to LTE (long term evolution), LTE-A (LTE-advanced), SUPER 3G, IMT-advanced, 4G, 5G, FRA (future radio access), W-CDMA (registered trademark), GSM (registered trademark), CDMA2000, UMB (ultra mobile broadband), IEEE 802.11 (Wi-Fi), IEEE 802.16 (WiMAX), IEEE 802.20, UWB (ultra-wide band), Bluetooth (registered trademark), other systems that use suitable systems and/or next-generation systems expanded on the basis thereof.

The order of the process steps, sequences, flowcharts, and the like of each mode/embodiment explained in the present specification may be interchanged, provided no specific order exists. For example, the methods explained in the present specification present elements of various steps using the orders thereof as examples, and the orders are not limited to the specific orders presented.

Each mode/embodiment explained in the present specification may be used singularly or combined, or switched according to the execution thereof. Moreover, notification of predetermined information (for example, notifying "of being X") is not limited to being performed explicitly, and may be performed implicitly (for example, not notifying about the predetermined information).

The terms "system" and "network" are used interchangeably in the present specification.

The information or parameter explained in the present specification may be represented as absolute values or represented as relative valued from predetermined values, or may be represented as other corresponding information. For example, a wireless resource may be indicated by an index.

The above-described names used for the parameters are not limited in any respect. Moreover, mathematical formulae or the like that use the parameters sometimes differ from those explicitly disclosed in the present specification. Various channels (for example, PUCCH, PDCCH, etc.) and information elements (for example, TPC, etc.) can be identified using suitable names; therefore, the various names assigned to the various channels and information elements are not limited in any respect.

The term "determining" used in the present specification may include various operations. The term "determining" may include, for example, "determining" of judging, calculating, computing, processing, deriving, investigating, looking up (for example, looking up in a table, database or another data structure), and ascertaining. Moreover, the term "determining" may include "determining" of receiving (for example, receiving information), transmitting (for example, transmitting information), input, output, and accessing (for example, accessing data in a memory). Furthermore, the term "determining" may include "determining" of resolving, selecting, choosing, establishing, comparing, and the like. That is, the term "determining" may include the fact that some operation has been "determined."

The present invention may be presented as a method comprising a step of processing performed in flight control system 1 and/or flying body operation management device

50. Moreover, the present invention may be presented as a program that is executed in flying body operation management device 50. The program can be presented by a mode of being recorded in a recording medium such as an optical disk, presented by a mode of being downloaded onto a computer via a network such as the Internet, and installing the program so as to be usable, or the like.

Software, instructions, and the like may be transmitted/ received via a transmission medium. If, for example, software is transmitted from a website, a server or another remote source using wired technology such as a coaxial cable, an optical fiber cable, a twisted pair wire, a digital subscriber line (DSL) or the like and/or wireless technology such as infrared rays, wireless and microwaves, the wired technology and/or wireless technology are included in the definition of a transmission medium.

The information, signals and the like explained in the present specification may be represented using any of various different techniques. For example, data, instructions, commands, information, signals, bits, symbols, chips, and the like, which may be mentioned across the entire explanation above, may be represented by voltage, current, magnetic waves, magnetic fields or magnetic particles, optical fields or protons, or an arbitrary combination thereof.

The terms explained in the present specification and/or terms required to understand the present specification may be replaced with terms having the same or similar meanings. For example, channel and/or symbol may be signal. Moreover, signal may be message. Furthermore, component carrier (CC) may be referred to as carrier frequency, cell, or the like.

The overall element amount or order of various references to elements referred to as "the first," "the second" and the like in the present specification are not limited thereto. The references may be used in the present specification as methods that are useful for differentiating between two or more elements. Accordingly, references to the first and second elements do not signify that only the two elements may be adopted in that instance, or that the first element must precede the second element in some form.

The term "means" in the configuration of each device described above may be replaced with the terms "unit," "circuit," "device," or the like.

As long as the terms "including," "comprising" and modifications thereof are used within the present specification or claims, the intention of the terms are comprehensive, similarly to the term "provided with." Moreover, the intention for the term "or" used in the present specification or claims is not to be an exclusive or.

In the entirety of the present disclosure, if, for example, an article (a, an, the) is added, the article is considered to include plurals thereof if it is not clearly singular from the context.

A wireless frame may comprise one or a plurality of frames in a time region. In a time region, one or a plurality of each frame may be referred to as a subframe. A subframe may further comprise one or a plurality of slots in a time region. A subframe may be a fixed length of time (for example, 1 ms) that is not dependent upon numerology.

A numerology may be a communication parameter applied to the transmission and/or reception of a given signal or channel. A numerology may indicate, for example, one or more of the following: subcarrier spacing (SCS), bandwidth, symbol length, cyclic prefix length, transmission time interval (TTI), the number of symbols per TTI, wireless frame configuration, a specific filtering process performed by a transmitter/receiver in a frequency region, and a specific windowing process performed by a transmitter/receiver in a time region.

A slot may comprise one or a plurality of symbols (orthogonal frequency division multiplexing (OFDM) symbol, single carrier frequency division multiple access (SC-FDMA) symbol, etc.) in a time region. A slot may be a time unit based on numerology.

A slot may include a plurality of mini-slots. Each mini-slot may comprise one or a plurality of symbols in a time region. A mini-slot may be referred to as a sub-slot. A mini-slot may comprise a number of symbols that is smaller than the number of slots. A PDSCH (or PUSCH), which is transmitted at a greater time unit than that of the mini-slot, may be referred to as PDSCH (or PUSCH) mapping type A. A PDSCH (or PUSCH) transmitted using a mini-slot may be referred to as PDSCH (or PUSCH) mapping type B.

A wireless frame, a subframe, a slot, a mini-slot, and a symbol each represents a time unit when a signal is transmitted. A wireless frame, a subframe, a slot, a mini-slot, and a symbol may be referred to using another term corresponding to each thereof.

For example, one subframe may be referred to as a transmission time interval (TTI), a plurality of continuous subframes may be referred to as a TTI, and one slot or one mini-slot may be referred to as a TTI. That is, a subframe and/or a TTI may be a subframe (1 ms) in an existing LTE, may be a period shorter than 1 ms (for example, 1-13 symbols), and may be a period longer than 1 ms. A unit representing TTI may be referred to as a slot, a mini-slot, or the like rather than a subframe.

Here, a TTI refers to the shortest time unit in the scheduling of wireless communication, for example. For example, in an LTE system, a base station performs scheduling, which consists of assigning wireless resources (frequency bandwidth, transmission power, etc. capable of being used in each user terminal) to each user terminal using a TTI unit. The definition of TTI is not limited thereto.

A TTI may be a transmission time unit such as a data packet (transport block), a code block, or a code word, which has been channel-encrypted, or a processing unit such as scheduling or link adaptation. When a TTI is assigned, the time interval (for example, the number of symbols) in which a transport block, a code block, a code word, etc. is actually mapped may be shorter than the TTI.

When one slot or one mini-slot is referred to as a TTI, one or more TTIs (that is, one or more slots or one or more mini-slots) may serve as the smallest time unit in the scheduling. Moreover, the number of slots (number of mini-slots) that constitute the smallest time unit in the scheduling may be controlled.

A TTI having a time length of 1 ms may be referred to as an ordinary TTI (TTI in LTE Rel. 8-12), a normal TTI, a long TTI, an ordinary subframe, a normal subframe, a long subframe, a slot, or the like. A TTI that is shorter than an ordinary TTI may be referred to as an abbreviated TTI, a short TTI, a partial TTI (or fractional TTI), an abbreviated subframe, a short subframe, a mini-slot, a subslot, a slot, or the like.

A long TTI (for example, an ordinary TTI, a subframe, etc.) may be replaced by a TTI having a time length exceeding 1 ms, and a short TTI (for example, an abbreviated TTI) may be replaced by a TTI having a TTI length shorter than that of the long TTI and equal to or greater than 1 ms.

A resource block (RB) is a resource assignment unit for a time region and a frequency region, and a frequency region may include one or a plurality of continuous subcarriers. The number of subcarriers included in an RB may be the same regardless of numerology, and may be 12, for example. The number of subcarriers included in an RB may be determined on the basis of numerology.

The time region of an RB may include one or a plurality of symbols, and may be the length of one slot, one mini-slot, one subframe, or one TTI. One TTI, one subframe, or the like may each comprise one or a plurality of resource blocks.

One or a plurality of RBs may be referred to as a physical resource block (PRB, physical RB), a subcarrier group (SCG, sub-carrier group), a resource element group (REG), a PRB pair, an RB pair, or the like.

Moreover, a resource block may comprise one or more resource elements (RE). For example, one RE may be the wireless resource region of one subcarrier and one symbol.

A bandwidth part (BWP) (may be referred to as partial bandwidth or the like) may represent a subset of continuous common resource blocks (common RBs) for a given numerology in a given carrier. Here, common RBs may be specified by an RB index that uses common reference points of the carrier as a reference. A PRB is defined by a given BWP, and may be numbered within the BWP.

A BWP may include a BWP for UL (UL BWP) and a BWP for DL (DL BWP). One or a plurality of BWPs may be set within one carrier with respect to a UE.

At least one of the BWPs that have been set may be active, and it is not necessary to assume that the UE transmits/receives a predetermined signal/channel outside of an active BWP. The "cell," "carrier," and the like in the present disclosure may be replaced by a "BWP".

The structures of the above-described wireless frame, subframe, slot, mini-slot, symbol and the like are merely examples. For example, the configuration of the number of subframes included in a wireless frame, the number of slots per subframe or wireless frame, the number of mini-slots included within a slot, the number of symbols and RBs included in a slot or a mini-slot, the number of subcarriers included in an RB, the number of symbols, length of symbol, length of cyclic prefix (CP) within a TTI, and the like may be modified in a variety of ways.

In the present disclosure, terms such as "base station (BS)," "wireless base station," "fixed station," "NodeB," "eNodeB (eNB)," "gNodeB (gNB)," "access point," "transmission point," "reception point," "transmission/reception point," "cell," "sector," "cell group," "carrier," and "component carrier" may be used interchangeably. A base station is sometimes referred to by the terms macro cell, small cell, femtocell, picocell, or the like.

A base station is capable of accommodating one or a plurality (three, for example) of cells. If a base station accommodates a plurality of cells, the entire coverage area of the base station can be divided into a plurality of smaller areas, and each of the smaller areas is capable of providing a communication service using a base station subsystem (for example, a remote radio head (RRH)). The terms "cell" or "sector" indicates a portion or the entirety of the coverage area of the base station that performs a communication service in the aforementioned coverage area and/or the base station subsystem.

In the present disclosure, the terms "mobile station (MS)," "user terminal," "user equipment (UE)," "terminal," and the like can be used interchangeably.

A mobile station is sometimes referred to by a person skilled in the art using suitable terms such as a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, and the like.

A base station and/or a mobile station may be referred to as a transmission device, a reception device, a communication device, or the like. The base station and/or the mobile station may be a device mounted on a moving body or a moving body itself. The moving body may be a vehicle (for example, a car, an airplane, etc.), an unmanned moving body (for example, a drone, a self-driving car, etc.), or a robot (manned or unmanned). The base station and/or the mobile station include a device that does not necessarily move at the time of communication operation. For example, the base station and/or mobile station may be an Internet of Things (IoT) device such as a sensor.

The base station in the present disclosure may be replaced by a user terminal. For example, each mode/embodiment of the present disclosure may be applied to a configuration in which communication between a base station and a user terminal is replaced by communication among a plurality of user terminals (may be referred to as D2D (device-to-device), V2X (vehicle-to everything), etc., for example). In such a case, the configuration of a user terminal may be used as the abovementioned functions of the base station. Moreover, words such as "uplink" and "downlink" may be replaced with words corresponding to communication among terminals (side, for example). For example, uplink channel, downlink channel, and the like may be replaced with side channel.

Similarly, a user terminal in the present disclosure may be replaced by a base station. In such a case, the configuration of a base station may be used as the abovementioned functions of the user terminal.

The terms "connected," "coupled," and all variations thereof signify all direct or indirect connection or coupling between two or more elements, and may include the fact that one or more intermediate element is present between two elements that have been "connected" or "coupled." Connection or coupling between elements may be physical, logical, or a combination thereof. For example, "connection" may be replaced with "access." When used in the present disclosure, it can be considered that two elements are "connected" or "coupled" to/with each other by use of one or more wire, cable, and/or print electric connection, and as some non-limiting and non-comprehensive examples, by use of electromagnetic energy or the like having a wavelength of a wireless frequency region, a micro-wave region, and a light (both visible and invisible) region.

Above is a detailed explanation of the present invention, but it would be obvious to a person skilled in the art that the present invention is not limited to the embodiment explained in the present specification. The present invention may be embodied as corrected and modified modes without deviating from the purpose and scope of the present invention defined by the disclosure in the claims. Accordingly, the disclosure in the present specification aims to explain examples, and does not have a limited significance with respect to the present invention.

EXPLANATION OF THE REFERENCE NUMERALS

1: flight control system.
10: flying body.
20, 30: wireless communication terminals.
40: network.
41: wireless base station.

50: flying body operation management device.
51: detection unit.
52: suppression unit.
53: flight management unit.
501: control unit.
502: storage unit.
503: communication unit.

What is claimed is:

1. A control device comprising:
a processor configured to:
   detect an occurrence of a propagation delay equal to or greater than a threshold value in an uplink of a time-division duplex between a first wireless communication terminal and a first wireless base station to which the first wireless communication terminal is wirelessly connected;
   in response to detection of the propagation delay equal to or greater than the threshold value, perform control pertaining to resources in the time division duplex to suppress, in a second wireless communication terminal wirelessly connected to a second wireless base station different from the first wireless base station, occurrence of a communication failure caused by uplink communication performed by the first wireless communication terminal under the propagation delay; and
   perform the suppression upon detecting that the second wireless communication terminal is present within a range of a given distance from the first wireless communication terminal or that the second wireless communication terminal is performing a time-division duplex with the second wireless base station with a guard period that is shorter than a guard period used between the first wireless communication terminal and the first wireless base station.

2. The control device according to claim 1, wherein the given distance is a distance at which the second wireless communication terminal is capable of receiving a wireless signal wave transmitted from the first wireless communication terminal at a reception strength that is equal to or greater than a threshold value.

3. The control device according to claim 1, wherein the processor is further configured to:
   perform the suppression by synchronizing a length of time and a timing of guard periods used by the first wireless base station and the second wireless base station.

4. A control device comprising:
a processor configured to:
   detect an occurrence of a propagation delay equal to or greater than a threshold value in an uplink of a time-division duplex between a first wireless communication terminal and a first wireless base station to which the first wireless communication terminal is wirelessly connected;
   in response to detection by the detection unit of a propagation delay equal to or greater than the threshold value, to perform control pertaining to resources in the time division duplex to suppress, in a second wireless communication terminal wirelessly connected to a second wireless base station different from the first wireless base station, occurrence of a communication failure caused by uplink communication performed by the first wireless communication terminal under the propagation delay;
   perform the suppression by assignment of resources in the time-division duplex of the first wireless communication terminal, or by control of a timing at which the uplink communication is performed in the time-division duplex of the first wireless communication terminal; and
   perform the suppression by causing the first wireless communication terminal to perform the uplink communication in the time-division duplex at a timing that matches a start timing of a shortest guard period from among guard periods used by one or a plurality of the second wireless communication terminals.

5. The control device according to claim 4, wherein the processor is further configured to:
   perform the suppression by refraining from assigning resources within a special subframe in the time-division duplex to the first wireless communication terminal.

6. The control device according to claim 4, wherein the processor is further configured to:
   perform the suppression by refraining from assigning resources immediately following a guard period in the time-division duplex to the first wireless communication terminal.

7. The control device according to claim 4, the processor is further configured to:
   perform the suppression by assigning resources to the first wireless communication terminal, the resources corresponding to a start timing of a shortest guard period from among guard periods used by one or a plurality of the second wireless communication terminals, and to the propagation delay between the first wireless communication terminal and the first wireless base station.

8. A control method comprising:
   detecting an occurrence of a propagation delay equal to or greater than a threshold value in an uplink of a time-division duplex between a first wireless communication terminal and a first wireless base station to which the first wireless communication terminal is wirelessly connected;
   in response to the detection of the propagation delay equal to or greater than the threshold value, performing control pertaining to resources in the time division duplex to suppress, in a second wireless communication terminal wirelessly connected to a second wireless base station different from the first wireless base station, occurrence of a communication failure caused by uplink communication performed by the first wireless communication terminal under the propagation delay; and
   performing the suppression upon detecting that the second wireless communication terminal is present within a range of a given distance from the first wireless communication terminal or that the second wireless communication terminal is performing a time-division duplex with the second wireless base station with a guard period that is shorter than a guard period used between the first wireless communication terminal and the first wireless base station.

9. The control method according to claim 8, wherein the given distance is a distance at which the second wireless communication terminal is capable of receiving a wireless signal wave transmitted from the first wireless communication terminal at a reception strength that is equal to or greater than a threshold value.

10. The control method according to claim 8, further comprising:
   performing the suppression by synchronizing a length of time and a timing of guard periods used by the first wireless base station and the second wireless base station.

11. A control method comprising:
- detecting an occurrence of a propagation delay equal to or greater than a threshold value in an uplink of a time-division duplex between a first wireless communication terminal and a first wireless base station to which the first wireless communication terminal is wirelessly connected;
- in response to the detection of the propagation delay equal to or greater than the threshold value, performing control pertaining to resources in the time division duplex to suppress, in a second wireless communication terminal wirelessly connected to a second wireless base station different from the first wireless base station, occurrence of a communication failure caused by uplink communication performed by the first wireless communication terminal under the propagation delay;
- performing the suppression by assignment of resources in the time-division duplex of the first wireless communication terminal, or by control of a timing at which the uplink communication is performed in the time-division duplex of the first wireless communication terminal; and
- performing the suppression by causing the first wireless communication terminal to perform the uplink communication in the time-division duplex at a timing that matches a start timing of a shortest guard period from among guard periods used by one or a plurality of the second wireless communication terminals.

12. The control method according to claim 11, further comprising:
- performing the suppression by refraining from assigning resources within a special subframe in the time-division duplex to the first wireless communication terminal.

13. The control method according to claim 11, further comprising:
- performing the suppression by refraining from assigning resources immediately following a guard period in the time-division duplex to the first wireless communication terminal.

14. The control method according to claim 11, further comprising:
- performing the suppression by assigning resources to the first wireless communication terminal, the resources corresponding to a start timing of a shortest guard period from among guard periods used by one or a plurality of the second wireless communication terminals, and to the propagation delay between the first wireless communication terminal and the first wireless base station.

* * * * *